UNITED STATES PATENT OFFICE.

GIUSEPPE ODDO, OF PAVIA, ITALY.

INSECTICIDE.

948,739.

Specification of Letters Patent. Patented Feb. 8, 1910.

No Drawing. Application filed July 17, 1908. Serial No. 443,987.

*To all whom it may concern:*

Be it known that I, GIUSEPPE ODDO, a subject of the King of Italy, and resident of Pavia, in the Kingdom of Italy, have invented certain new and useful Improvements in Insecticides, of which the following is a specification.

The object of the present invention is to provide an anticryptogamic and antiparasitical powder having the necessary qualities for successfully fighting the *Peronospora* and all other parasites of plants, which shall be economical in its production and efficient in use. I obtain such powder by means of a special treatment of mixed ores of heavy metals coming directly from the mines, or the residuums of metallurgical works where such ores are treated.

Heretofore it has been proposed to employ for the aforesaid purpose the copper salts whether in diluted solution, or suspended in water in the form of hydrate, as in the so-called mixture of Bordeaux, and also in other forms of combination.

I have found by experiment that the protecting and restoring action is not a particular prerogative of the copper compounds as heretofore has been believed, but that it is possessed also, in different degrees, by all the compounds of heavy metals. I have also found by experiments that although these may be used in the form of solutions, it is preferable to use the insoluble combinations which have been found to display all their efficiency for the destruction of the parasites of the plants without exercising any caustic or other harmful action on the plants.

In carrying out my invention I proceed as follows:—I employ mixed heavy metals, and especially those containing in prevalence zinc, besides lead and iron, which are the most common, together or not with other more rare heavy metals. All these ores of heavy metals are first roasted and reduced to a very fine powder, and then treated with sulfuric acid, at first at ordinary temperature, and then at high temperature, until the transformation of all the salts into sulfates is complete or very advanced. It is necessary to stir hastily and continually the mixture because, otherwise, the material, being heavy, accumulates at the bottom of the receiver and the solution of sulfuric acid, which is lighter, remains at the surface. The product so obtained is diluted in water and treated, firstly at cold temperature, and then, if it is necessary, at high temperature, with milk of lime or powder of lime, until a neutral or slightly alkaline reaction ensues. The mass so obtained, must be left sometime at rest, and then, after having decanted the liquid, it must be dried and submitted at last to grinding and to sifting in such a manner that an impalpable and uniform powder is obtained. The activity is proportional to the quantity of heavy metals contained in the mixture.

The solution of the sulfate of copper and of the soluble salts of other heavy metals when they exceed a predetermined concentration, exercise a pernicious action on the plant, so that they become unsuitable for use against the cryptogams and generally against every parasite of the plant. From that ensues the necessity and convenience of neutralizing the mass, and this neutralization may be made by lime, this material being very economical, but it may be evidently obtained by any other material leading to the same result, not excluding the salts of the weak or insoluble acids, like the borates and the silicates.

Some of the operations of the described process may be omitted, when the nature of the mineral permits it. For some ores, as for instance, the oxids and carbonates, the roasting may be omitted.

The treating before described supposes the employment of mixed substances containing in convenient proportion the minerals of heavy metals to be treated. This occurs nearly always with the substances proceeding directly from the metalliferous mines, but for working residuums from the siderurgical establishments, it is necessary to ascertain whether in these residuums there remain in convenient proportions the elements upon which the aforesaid treatment is based. For example, let us suppose that the mixed substance is composed of zinc, or lead, and iron ores, and of other heavy metals, which are in the form of neutral or basic carbonates or hydrates, which may be slightly attacked by the sulfuric acid; in this case, it is evidently sufficient to pulverize and treat them firstly at cold and then high temperature, until complete reaction, by a little more than the calculated quantity of sulfuric acid, which is necessary to transform all the metals into sulfates. The action of sulfuric acid is ordinarily completed, in such conditions, in about twelve hours of contact at the ordinary temperature, and about twenty-four at that of 100°. The same is true if the ore contains in prevalence sulfid of zinc and other sulfids of heavy metals, which may be easily attacked by the sulfuric acid, in those conditions, and transformed into sulfates. On the contrary, if the mixed ore contains sulfids not attacked by sulfuric acid in those conditions, as those of lead, iron and copper, in order to render possible the attack, it is necessary to roast the ore for transforming directly some sulfids into sulfates, and others into oxids, according to their nature; the mass so obtained will be then treated with sulfuric acid, according to the conditions and quantity already given. The sulfuric acid to be employed must always be of 30° to 35° Bé. In all cases the product of the reaction will be alkalized slightly with lime and the whole insoluble mass dried and sifted. The powder thus obtained contains material which remains inactive against *Peronospora* or other parasites, which consists of sulfate of lime, silicious sand, and any silicates which have not been attacked by the sulfuric acid; but it contains above all a mixture of products which are insoluble or practically so in water, principally formed by any neutral or basic sulfates, by hydrates and metallic oxid, which do not exercise any caustic, venomous or any pernicious action on the plants, while they all exercise an efficacious action against the *Peronospora* and the other parasites, so that the powder prepared in the aforesaid manner is extremely useful for the purpose stated.

The resultant powder consists of an admixture of products which are insoluble or nearly so and are strongly active against the *Peronospora* and other parasitical diseases, their activity being proportional to the quantity of compounds of heavy metals contained in the mixture.

The most convenient proportion of the substances may be determined by the results obtained by practical application in the different cases.

The stirring of the mixture avoids fusion of the sulfates.

What is claimed as new is:—

The process of fabrication of an insecticide powder insoluble in water, consisting in roasting and grinding copper ore, treating the same with sulfuric acid first at ordinary and then at a high temperature until all the salts are transformed into sulfates, then treating the mass so obtained with lime, until a neutral reaction takes place, then decanting and finally drying, grinding and sifting the precipitate.

In witness whereof I have hereunto set my hand in presence of two witnesses.

GIUSEPPE ODDO.

Witnesses:
C. MERLO APINAS,
J. DE FEO SAFFRETTE.